T. J. Murphy,
Automatic Gate,
N° 84,569. Patented Dec. 1, 1868.
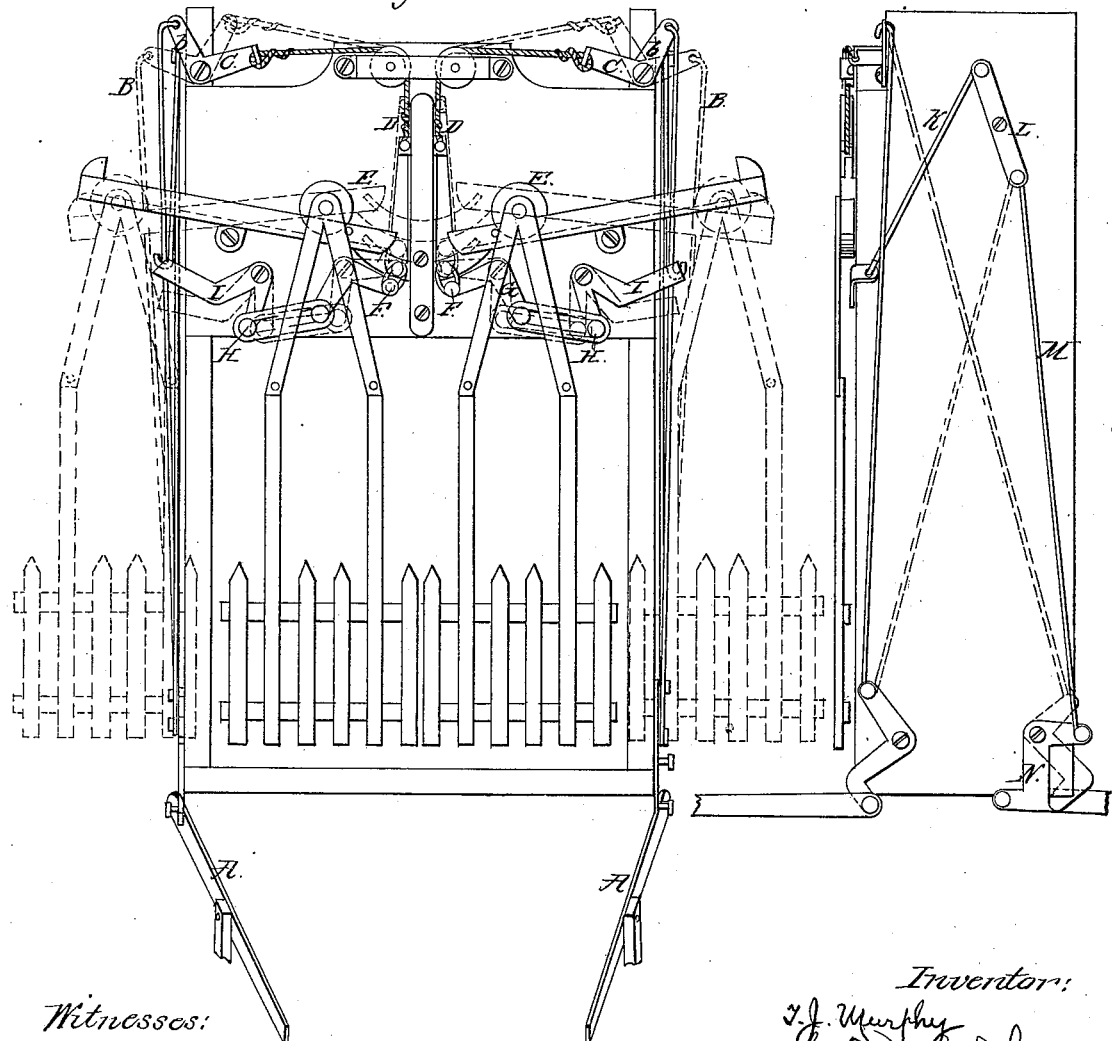

United States Patent Office.

THOMAS J. MURPHY, OF ROCHESTER, NEW YORK.

Letters Patent No. 84,569, dated December 1, 1868; antedated November 18, 1868.

IMPROVEMENT IN AUTOMATIC GATE.

The Schedule referred to in these Letters Patent and making part of the same.

*To all whom it may concern:*

Be it known that I, THOMAS J. MURPHY, of Rochester, in the county of Monroe, and State of New York, have invented a new and useful Improvement in Automatic Gates; and I do hereby declare the following to be a clear, full, and exact description of the same, sufficient to enable others skilled in the art to which my invention appertains, to fully understand and use the same, reference being had to the accompanying drawings, making part of this specification, and in which—

Figure 1 is a front view of the device, illustrating my invention.

Figure 2 is a side view thereof.

Similar letters of reference indicate like parts in both figures.

My invention consists in certain new and useful means for opening and closing gates by the weight of the wagon or carriage, whose front wheels pass over levers operating the necessary parts, which raise and lower slides, on which the gates are hung, as will be hereinafter more fully described.

In the drawings, A represents ordinary levers, pivoted to short standards, rising from the ground or flooring. The inner ends thereof are connected, by rods, to elbow-levers, which are pivoted to the side pieces of the frame-work which supports the gate.

These elbow-levers are also connected to the lower end of vertical rods B, whose upper ends are connected to elbow-levers C, which are pivoted at opposite points of the upper ends of the frame-work.

The levers C point toward each other, and have secured to their inner ends cords or chains, which pass over pulleys journalled to the frame-work, and then are connected to slides D.

These slides are suitable strips or pieces, guided in their rising and falling motions by straps or guides secured to the upper part of the frame-work.

E represents levers, which are pivoted, at or about their middle points, to the frame-work, and have one end pivoted to the slides D, and their other ends formed with shoulders or stops.

In this lever E, I mount pulleys, carrying the arms by which the right and left sections of the gate are suspended.

It will be seen that the gate is represented, in black, in a closed position. Now, when the fore wheels of the carriage or wagon depress the outer ends of lever A, the rod B and elbow-levers C are operated, so as to raise the slides D and the inner ends of the levers.

By these means, the roller carries the gates away from each other, and thus opens them, as indicated in red.

To the frame-work of the gate I also pivot levers G and I, which are connected together by loops H, and pivoted to the slides D by gimbal-loops T.

The outer ends of lever I have pivoted to them rods K, connected to levers L, whose bearings are on the sides of the frame-work.

These levers L have secured to them the upper ends of rods M, whose lower ends are connected to elbow-levers N, to which levers O are pivoted.

When the levers O are depressed, they operate the levers N L, and rods M K, and the elbow-levers G I, and loops F H, thereby raising slides D, and lowering the inner ends of the swinging levers E. The rollers then are directed towards the centre of the frame-work, carry the gates towards each other, and thus close them again.

The various parts should be duplicated, in order that the gate will be closed or shut, when the vehicle is going in or out.

My device will be found practical and useful.

Having thus described my invention,

What I claim as new, and desire to secure by Letters Patent, is—

1. The swinging lever E, in combination with the slide D, elbow-levers C, rod B, and lever A, substantially as and for the purpose described.

2. The swinging lever E, in combination with loops F H, elbow-levers G I N, rods K M, and levers L O, substantially as and for the purpose described.

T. J. MURPHY.

Witnesses:
J. D. CLARK,
JOHN T. C. CLARK.